United States Patent
Ramaswamy et al.

(10) Patent No.: US 7,640,104 B2
(45) Date of Patent: Dec. 29, 2009

(54) VEHICLE NAVIGATION SYSTEM AND METHOD FOR DISPLAYING WAYPOINT INFORMATION

(75) Inventors: Deepak Ramaswamy, Farmington, MI (US); Manabu Kato, Novi, MI (US); Sadanori Horiguchi, Novi, MI (US)

(73) Assignee: Xanavi Informatics Corporation, Zama-shi (JP)

( * ) Notice: Subject to any disclaimer, the term of this patent is extended or adjusted under 35 U.S.C. 154(b) by 787 days.

(21) Appl. No.: 11/364,119

(22) Filed: Feb. 27, 2006

(65) Prior Publication Data

US 2007/0203643 A1   Aug. 30, 2007

(51) Int. Cl.
G01C 21/00 (2006.01)
G08G 1/09 (2006.01)
G06F 19/00 (2006.01)

(52) U.S. Cl. .................. 701/213; 701/204; 701/211; 340/995.24

(58) Field of Classification Search .................. 701/213, 701/211, 202, 204, 210, 207; 340/995.24
See application file for complete search history.

(56) References Cited

U.S. PATENT DOCUMENTS

| | | | | |
|---|---|---|---|---|
| 6,009,403 | A * | 12/1999 | Sato | 705/6 |
| 6,401,034 | B1 * | 6/2002 | Kaplan et al. | 701/209 |
| 6,553,313 | B1 | 4/2003 | Froeberg | |
| 6,587,782 | B1 * | 7/2003 | Nocek et al. | 701/200 |
| 6,763,300 | B2 | 7/2004 | Jones | |
| 6,898,517 | B1 | 5/2005 | Froeberg | |
| 6,904,359 | B2 | 6/2005 | Jones | |
| 7,388,519 | B1 * | 6/2008 | Kreft | 340/995.24 |
| 2002/0007306 | A1 | 1/2002 | Granger et al. | |
| 2002/0072848 | A1 | 6/2002 | Hamada et al. | |
| 2003/0182056 | A1 * | 9/2003 | Nozaki et al. | 701/209 |
| 2003/0233190 | A1 * | 12/2003 | Jones | 701/207 |
| 2004/0102875 | A1 * | 5/2004 | Johnson | 701/1 |
| 2004/0198389 | A1 | 10/2004 | Alcock et al. | |
| 2004/0209601 | A1 | 10/2004 | Obradovich et al. | |
| 2005/0021843 | A1 | 1/2005 | Duigenan et al. | |
| 2005/0049765 | A1 * | 3/2005 | Chetia et al. | 701/29 |
| 2005/0130676 | A1 * | 6/2005 | Broussard et al. | 455/456.6 |
| 2006/0265123 | A1 * | 11/2006 | Chon et al. | 701/209 |
| 2007/0005433 | A1 * | 1/2007 | Lee et al. | 705/14 |
| 2008/0288545 | A1 * | 11/2008 | Hegedus et al. | 707/104.1 |

FOREIGN PATENT DOCUMENTS

| | | | |
|---|---|---|---|
| WO | WO-2004/021110 A2 | 3/2004 | |
| WO | WO-2004/028234 A2 | 4/2004 | |
| WO | WO-2004/029758 A2 | 4/2004 | |

* cited by examiner

*Primary Examiner*—Tan Q Nguyen
(74) *Attorney, Agent, or Firm*—Gifford, Krass, Sprinkle, Anderson & Citkowski, P.C.

(57) ABSTRACT

A method for displaying waypoint information on the screen of a vehicle navigation system. The method includes the steps of displaying a route on the screen and inputting criteria which identify desired waypoints along the route as well as the desired time to reach the waypoint. The location of the desired waypoint along the route as a function of the desired time to reach the waypoint in traffic conditions is determined and that waypoint information is displayed on the screen. The method optionally utilizes two-way communication between the navigation system and waypoint content providers.

16 Claims, 4 Drawing Sheets

VEHICLE NAVIGATION SYSTEM AND METHOD FOR DISPLAYING WAYPOINT INFORMATION

BACKGROUND OF THE INVENTION

I. Field of the Invention

The present invention relates generally to automotive navigation systems and, more particularly, to both a method and apparatus for displaying waypoint information on the screen of the navigation system.

II. Description of Related Art

Automotive navigation systems have become increasingly prevalent in automotive vehicles. Such navigation systems typically include a display screen mounted in the vehicle in a position visible to the driver. Conventionally, such automotive navigation systems display a roadmap on the screen and, by using GPS to determine the location of the vehicle, also display the relative location of the vehicle on the screen.

Modern navigation systems also typically include means for indicating a desired destination point relative to the current location of the vehicle. Typically, the destination for the vehicle is inputted using a touch screen on the navigation system. Once the destination has been entered by the user, the navigation system determines the preferred route from the current location of the vehicle and to the destination point. That preferred route is then displayed on the screen of the navigation system.

These previously known navigation systems have performed satisfactorily for displaying route information from the current location of the vehicle and to the desired destination. However, in many cases it would be desirable to display waypoint information along the route. Such waypoint information could include, for example, the location of restaurants, motels and other commonly used travel facilities along the route.

While there have been previously known navigation systems capable of displaying the location of waypoint information along the route, these previously known systems have been unable to correlate the desired waypoint along the route with the time to reach that waypoint. Furthermore, the actual time that a waypoint may be reached along a route will vary as a function of the traffic flow conditions.

It is also advantageous for a navigation system to interactively receive waypoint information in the form of advertising from waypoint content providers. Such advertising would be mutually beneficial to both the advertising provider as well as the vehicle occupants.

SUMMARY OF THE PRESENT INVENTION

The present invention provides both a method and apparatus for a vehicle navigation system that overcomes the above-mentioned disadvantages of the previously known devices.

In brief, the navigation system of the present invention includes a display screen mounted in the automotive vehicle in a position visible to the driver. The navigation system includes a GPS receiver to determine the current location of the automotive vehicle as well as a map database. Using both the location of the vehicle as determined from data received by the GPS receiver and the map database, a map as well as the location of the vehicle is displayed on the screen.

The navigation system further includes an input device for inputting a desired destination point for the vehicle as well as other information. The input device may be a touch screen on the navigation system, keyboard, or a speech processor that responds to verbal commands from a vehicle occupant. Once the destination for the vehicle has been inputted into the navigation system, the navigation system using conventional algorithms determines a preferred route from the current position of the automotive vehicle to the point of destination and displays that information on the screen.

Unlike the previously known navigation systems, however, the navigation system of the present invention further includes both a means and a step for inputting not only desired waypoint information, but also the time desired to reach that particular waypoint. For example, the vehicle occupant may enter the desired waypoint such as "restaurant" as well as the desired time, such as "noon", into the navigation system using the input means. The navigation system then utilizes either a self-contained database containing waypoint information or, alternatively, via a two-way radio communication between the navigation system and waypoint content providers along the route.

The navigation system further updates the location of the desired waypoint as a function of the traffic flow condition. Consequently, the navigation system will display the desired waypoint information that the vehicle will reach at the desired time (within a predefined or user-defined time span and/or route deviation criteria) on the navigation system. Thus, by only displaying the desired waypoint information at the desired time the vehicle will reach that particular waypoint, screen clutter from unwanted waypoint information on the navigation screen is avoided.

BRIEF DESCRIPTION OF THE DRAWINGS

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
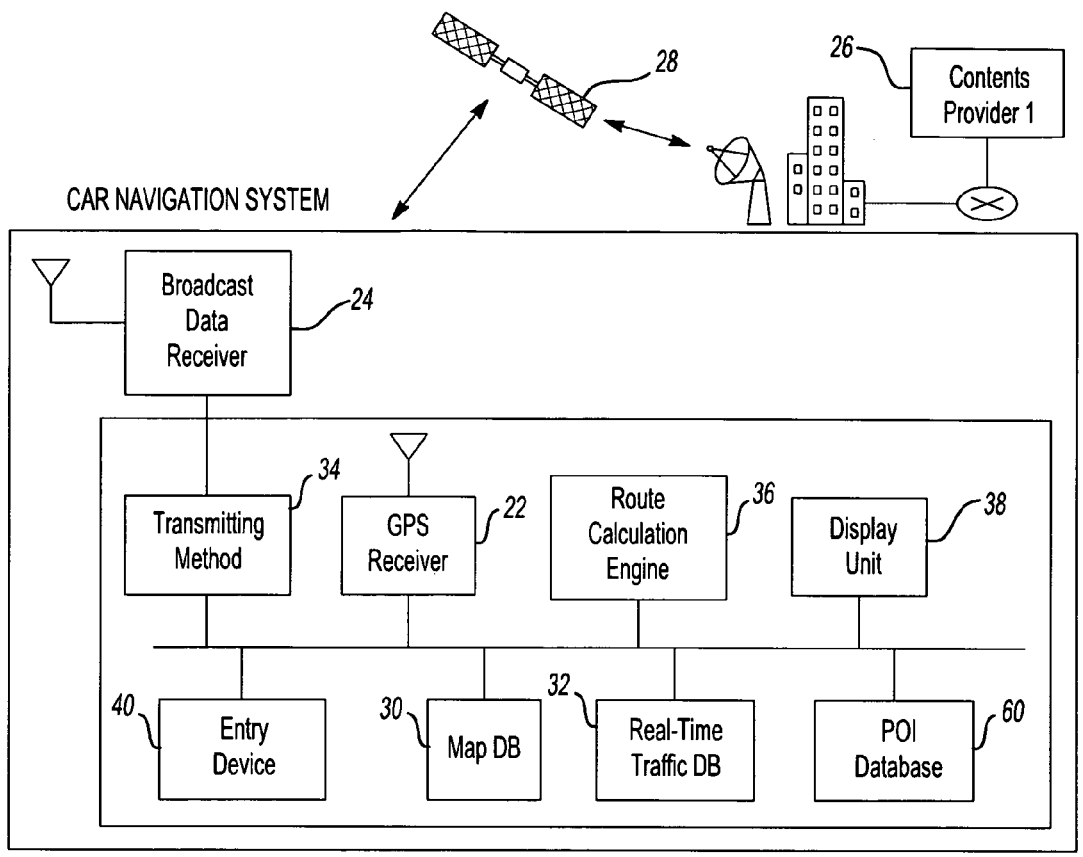
FIG. 1 is a block diagrammatic view illustrating a preferred embodiment of the present invention.

With reference first to FIG. 1, a block diagrammatic view of a preferred embodiment of the navigation system 20 of the present invention is shown. The navigation system 20 includes a GPS receiver 22 which receives the GPS satellite signals to determine the current position of the automotive vehicle. In addition, the navigation system 20 preferably includes a broadcast data receiver 24. This broadcast data receiver 24 receives information not only on current traffic flow conditions, but also from waypoint point of interest content providers 26. These content providers 26 may include, for example, various businesses, such as restaurants, hotels, motels, golf courses and the like, and the content is transmitted to the broadcast data receiver 24 in any conventional fashion, such as by satellite 28, Wi-Fi network, cell phone or the like.

The navigation system 20 further includes a map database 30 and, optionally, a real-time traffic database 32. The real-time traffic database 32 would utilize information from the traffic flow content providers 26 received through the broadcast data receiver 24.

A transmitting method 34 processes the information received from the broadcast data receiver 24 and provides this information to a route calculation engine 36. The route calculation engine 36 then determines the preferred route from the current position of the vehicle and to a destination and displays this information on a display unit 38, such as an LCD display.

A receiving or entry device 40 for the navigation system 20 enables an occupant of the vehicle to enter a desired destination point to the navigation system 20. The entry device 40 may be of any conventional construction, such as a touch screen (which may be the same as the display screen 38), a keyboard, a speech processor that receives oral commands via a microphone, or the like.

Figure 2:
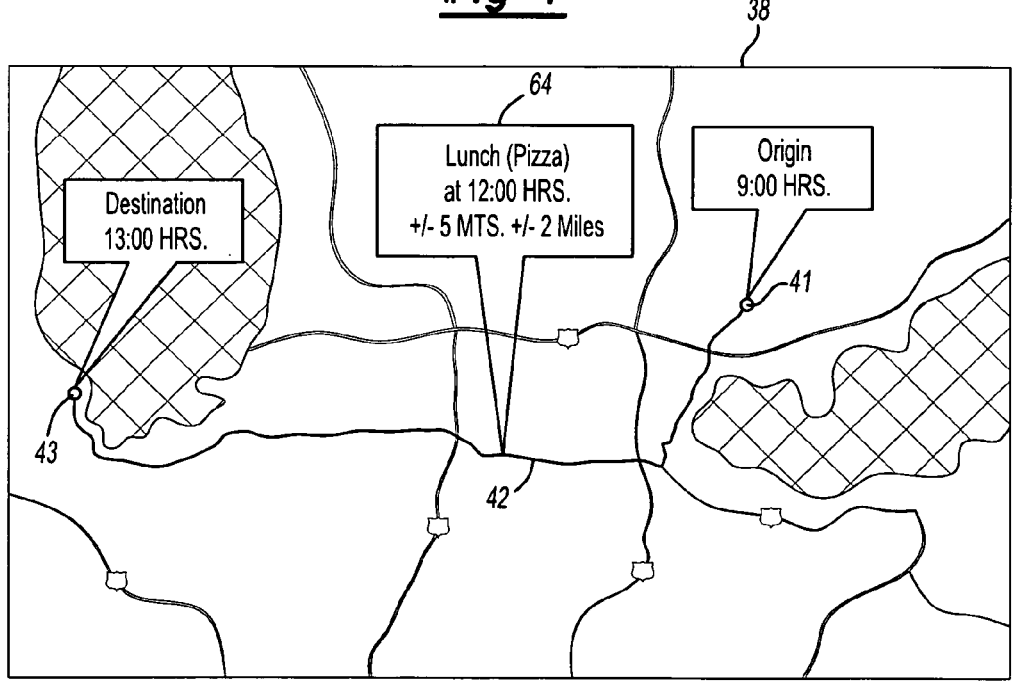
FIG. 2 is an exemplary screen display of the preferred embodiment of the present invention.

With reference now to FIGS. 1 and 2, after the desired destination has been entered into the navigation system 20 through the entry device 40, the route calculation engine 36 determines the preferred route from the current position 41 of the vehicle and to the destination 43 and displays that route 42 on the display screen 38. For example, as shown in FIG. 2, an exemplary route 42 from the current position 41 of the vehicle, illustrated as Detroit, Mich., to the desired destination 43, illustrated as Chicago, Ill., is displayed on the screen 38.

Figure 3:
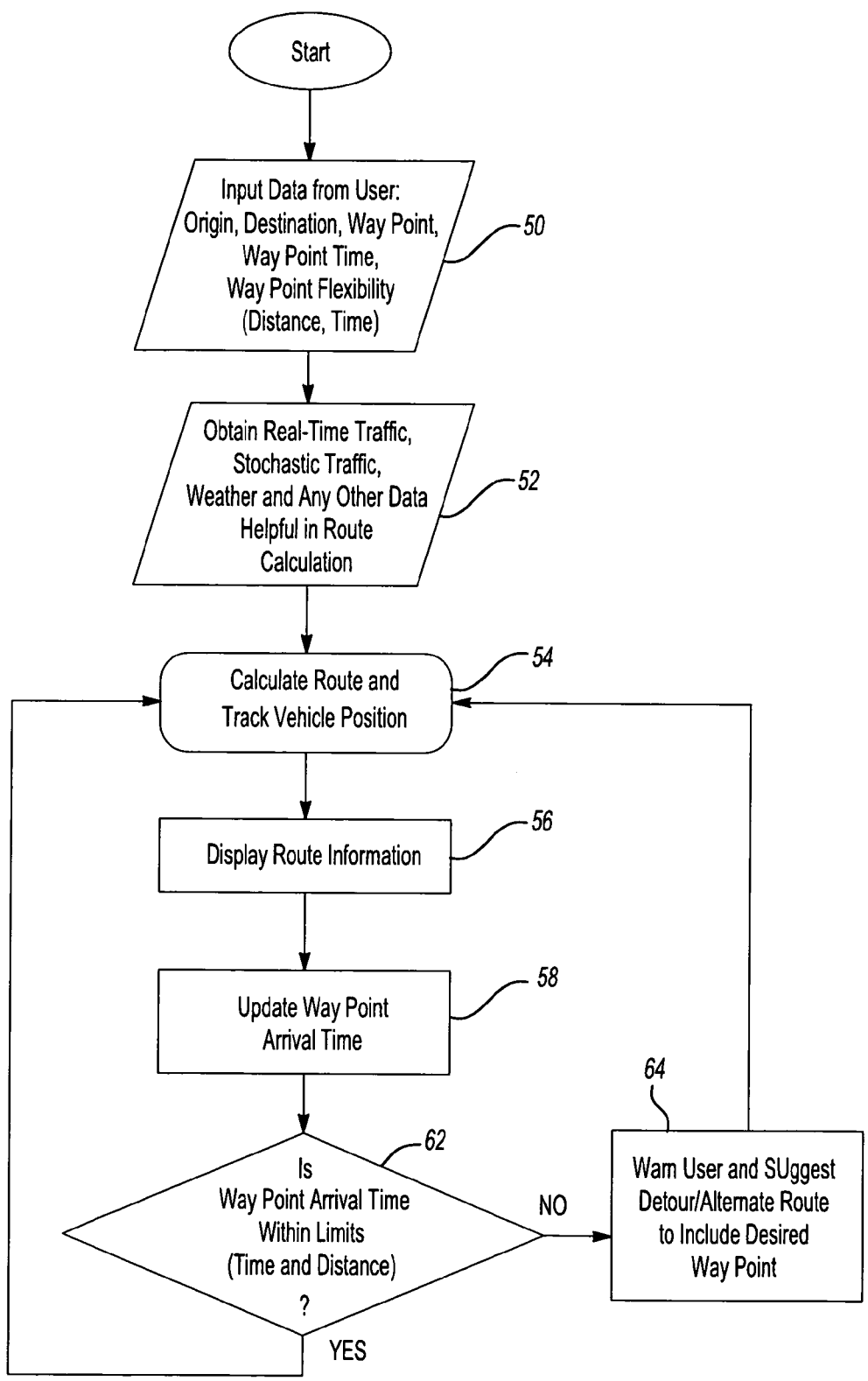
FIG. 3 is a flowchart illustrating the operation of a portion of the present invention.

With reference now to FIGS. 1-3, the vehicle occupant also utilizes the entry device 40 to input criteria for a desired waypoint, i.e. a point of interest (POI) along the route 42 including the current position 41 of the vehicle and the destination 43. The waypoint criteria may, for example, identify a particular waypoint such as "Twelve Oaks Golf Course" or the type of desired waypoint, such as "fast food restaurant" or "Italian food restaurant." As best shown in FIG. 3, at step 50 the vehicle occupant inputs the desired waypoint information into the navigation system 20. This desired information includes not only the type of waypoint, e.g. "restaurant", "McDonald's", "golf course", etc., but also the time that the vehicle occupant desires to reach that waypoint.

The vehicle occupant also utilizes the input device at step 50 to input the route and time deviation criteria in the identification of the waypoint. For example, the occupant may indicate that he or she desires to reach the particular waypoint at noon plus or minus fifteen minutes. Similarly, the occupant optionally indicates the deviation in distance from the route, e.g. two miles, that he or she is willing to travel in order to reach the desired waypoint. Step 50 then proceeds to step 52.

At step 52, the navigation system 20 receives the real-time traffic from the content provider 26 (FIG. 1), stochastic traffic, weather and any other data which would impact the preferred route between the current vehicle position 41 and to the destination 43 along the route 42. Step 52 then proceeds to step 54. At step 54, the route calculation engine 36 calculates the preferred route from the current position 41 and to the destination 43. Step 54 then proceeds to step 56 and displays the route 42 on the display screen 38.

After the route 42 is displayed on the screen 38 at step 56, step 56 proceeds to step 58 in which the navigation system accesses a waypoint POI database 60 (FIG. 1) and determines the location of a waypoint which meets the waypoint route and time deviation criteria entered at step 50 by the vehicle occupant. The waypoint POI database 60 may be either self-contained within the navigation system 20, e.g. in a hard disk drive, CD ROM or other persistent memory device. Optionally, the navigation system 20 receives information from content providers 26 as to the availability and location of different waypoints and stores that information in the POI database 60.

Since the identification of the desired waypoint established by the user at step 50 will vary as a function of the traffic flow conditions between the point of origin 41 and destination 43 along the route 42, step 58 iteratively identifies, if possible, the desired waypoint according to the occupant route and time deviation criteria during the vehicle travel. Step 58 then proceeds to step 62.

At step 62, the navigation system 20 searches the POI database 60 for the desired waypoint within the deviation criteria entered at step 50 and determines if the desired waypoint is found in the POI database 60. If so, step 62 branches back to step 54 and continuously and iteratively updates the vehicle position display on the screen 38 as well as determines if the waypoint will still be reached within the time and distance criteria established by the vehicle occupant. Once the appropriate waypoint has been identified and the waypoint is within the map currently displayed on the screen, the waypoint, optionally containing additional information relative to the waypoint, is displayed on the screen 38 as shown at 64 (FIG. 2).

In the event that the desired waypoint matching the criteria established by the occupant at step 50 cannot be located at step 62, step 62 instead branches to step 66. At step 66, the navigation system 20 provides the appropriate warning to the user that a waypoint matching the occupant's criteria cannot be located. Step 66 may then suggest optional routes necessary to reach the desired waypoint and/or alternate waypoints by displaying such information on the screen 38 or audibly informing the occupant via a speech processor.

For example, assume that the user at step 50 enters a time deviation of noon plus or minus fifteen minutes and step 58 identifies the desired waypoint arrival time as being 12:20 p.m. and thus outside the occupant time deviation criteria established by the occupant at step 50. In this event, the navigation system, using conventional weighting algorithms, will display the waypoint information together with an indication of the deviation from the criteria.

Alternatively, step 66, if unable to locate the desired waypoint within the criteria set by the occupant at step 50 and if further unable to locate the desired waypoint within reasonable deviations from the criteria set by the occupant at step 50, optionally displays alternative waypoints which are compatible with the desired waypoint inputted by the occupant. For example, if the occupant enters the desired waypoint as "McDonald's" and a McDonald's cannot be located which meets the criteria inputted at step 50 but the point of interest database 60 locates a similar restaurant, e.g. "Wendy's", that does match or almost match the criteria established at step 50, step 66 will display the substitute waypoint together with an indication of the substitution. Such an alternative waypoint would be disclosed in a fashion similar to the waypoint information 64 in FIG. 2.

From the foregoing, it can be seen that the present invention enables the vehicle occupant to input specific information as to the desired waypoint along a route as well as a time and optionally route deviation distance for that waypoint. The navigation system 20 then iteratively and continuously updates that waypoint information and, if the waypoint meeting the criteria cannot be located, optionally displays alternative waypoints or waypoints which almost meet the occupant criteria. For example, the vehicle occupants may enter "McDonald's" at noon as the desired waypoint with a time deviation of thirty minutes and a route deviation of two miles. In the event that no McDonald's restaurant can be found matching that criteria, the navigation system 20 will search the POI database for alternative waypoints which are similar to the desired waypoint, i.e. a fast food restaurant such as "Wendy's" or "Burger King".

Figure 4:
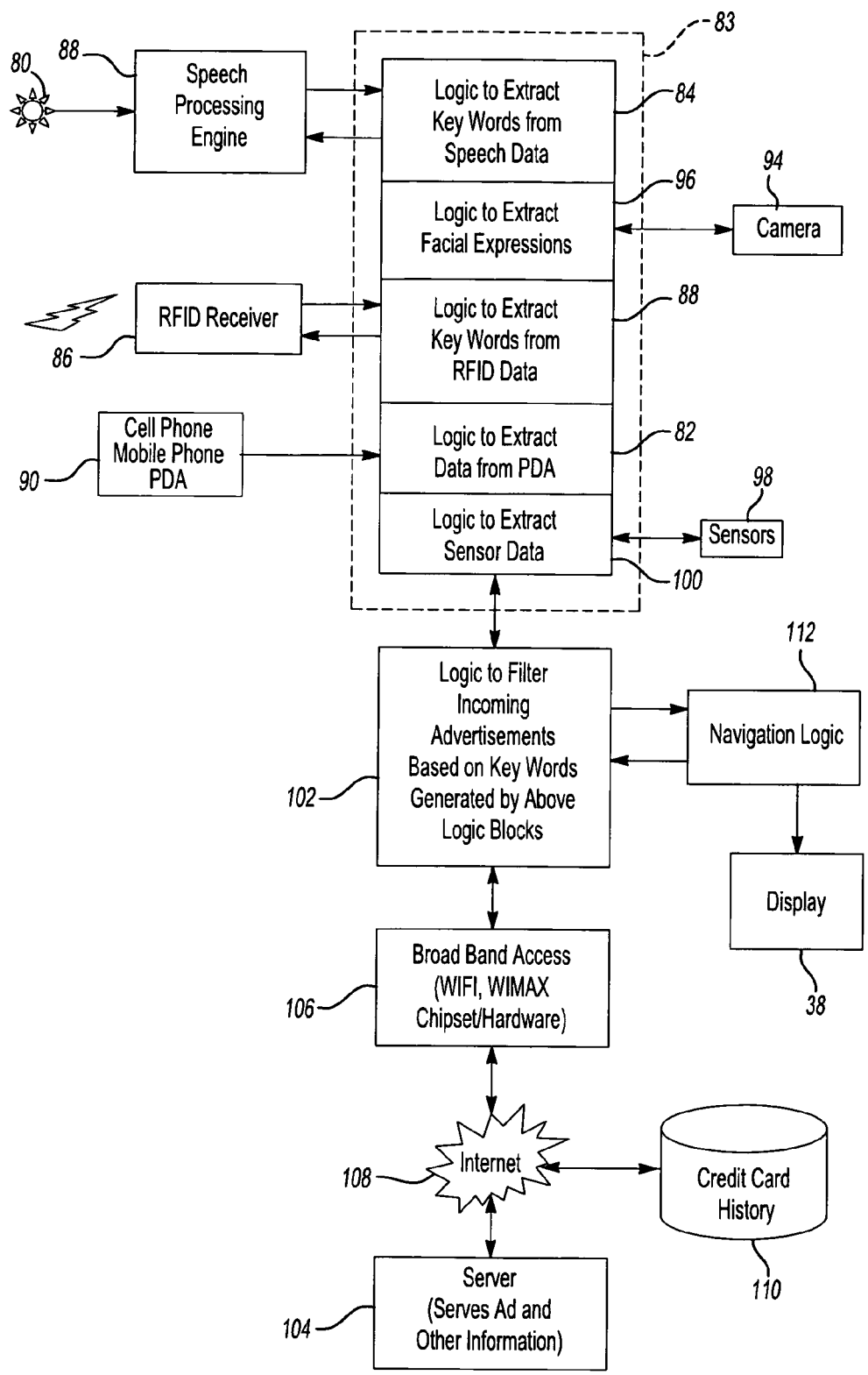
FIG. 4 is a diagrammatic view illustrating the operation of a portion of the preferred embodiment of the present invention.

With reference now to FIG. 4, the navigation system 20 optionally includes a system for extracting information regarding the occupants of the vehicle and then utilizes that extracted information to selectively display advertising regarding waypoints on the navigation screen 38.

One method of extracting information concerning the occupants of the vehicle is to include a microphone 80 within the vehicle occupation compartment so that the microphone 80 picks up speech from the vehicle occupants. That speech is then provided as an input signal to a speech processing engine 82. The output from the speech processing engine is then coupled as an input signal to a processor 83 programmed with a speech processing algorithm 84 which extracts key words from the speech data and stores those key words in the appropriate database.

An RFID receiver 86 may also be positioned within the vehicle passenger compartment and receives data from RFID tags, if present, in the vehicle. Such RFID tags are frequently attached to possessions and identify the type of that particular possession. Such RFID tags identify the types of goods the vehicle occupants own and may want to purchase in the future. For example, an RFID tag on an expensive purse from "Coach" would be indicative that the vehicle occupant might be interested in purchasing expensive designer clothes and accessories and accordingly would target such advertising for display by the navigation system.

The RFID receiver 86 provides its output to the processor 83 programmed with an RFID extraction algorithm which extracts the relevant RFID data and stores that data in memory.

Information from cell phones, laptop computers, PDAs and other electronic devices 90 may also be provided as input signals to processor 83 having an algorithm 92 which extracts the data from the PDA 90 and then processes that extracted data to identify key words. Those key words are then stored in memory by the processor 92.

Still other data concerning the passenger compartment may be provided as an input signal to the data processor 83. For example, a camera 94 may provide an input signal to the processor 83 which contains an algorithm 96 to extract information regarding the facial expressions or other information of the vehicle occupants and then store that information in memory. Such a camera may also be used to track the eyeball gaze of a vehicle occupant to determine which area of the screen the occupant is watching and then display appropriate information for that geographic area of the screen.

Similarly, various sensors 98, such as light sensors, heat sensors, and the like, representative of the environment of the vehicle and/or passenger compartment may also be provided as input signals to the processor 83. The processor 83 then contains the appropriate algorithm 100 to extract the data from the sensors. For example, an outside temperature reading of 92 degrees, indicative of a hot summer day, would target advertising for summer products, such as sun tan oil and beach clothing. Conversely, an outside temperature reading of 22 degrees, indicative of a cold winter day, would target advertising of winter products, such as winter garments.

Still referring to FIG. 4, after the processor 83 extracts various key word data from the various inputs, the processor 83 provides this information to a logic unit 102 which then establishes a filter capable of identifying advertising content regarding various waypoints along the route 42 that are of interest to the occupants of the vehicle. The logic filter 102, furthermore, may be either self-contained within the navigation system 20 or provided by an off-board server.

Once the logic filter 102 has been established, the navigation system receives advertising content from advertising providers 104 via broadband access 106, such as Wi-Fi or WiMAX. An internet link 108 is also optionally provided between the server and the logic advertising filter 102 to provide access to a credit card database 110 to accommodate purchases made by the vehicle occupants.

In operation, the processor 83 receives various information regarding both the vehicle, the environment of the vehicle and/or passenger compartment, as well as information from the occupants of the vehicle using the various input devices 80, 86, 90, 98 and 94. Using appropriate logic, the processor 83 extracts key words from the input devices and utilizes that information to form the logic filter 102 logic information of the type of advertising that would be of interest to the vehicle occupants. The processor 83 may optionally utilize historic data of the type of advertising of interest to the vehicle occupants which is stored by the processor in a historic data base.

Simultaneously, the navigation system continuously receives advertising content from advertising providers 104 and then provides this information through broadband access, such as Wi-Fi, WiMAX or direct radio transmission, to the logic filter 102. Upon receipt of this information from the advertising providers 104, the logic filter 102 disregards advertising content that does not meet the criteria of the logic filter. Instead, the logic filter only relays information received from the advertising content providers 104 to the navigation logic and display 112 which may be of interest to the vehicle occupants. In doing so, the system shown in FIG. 4 effectively minimizes screen clutter on the navigation screen 38 which simultaneously enhances the impact of advertising material that is displayed on the screen 38.

Figure 5:
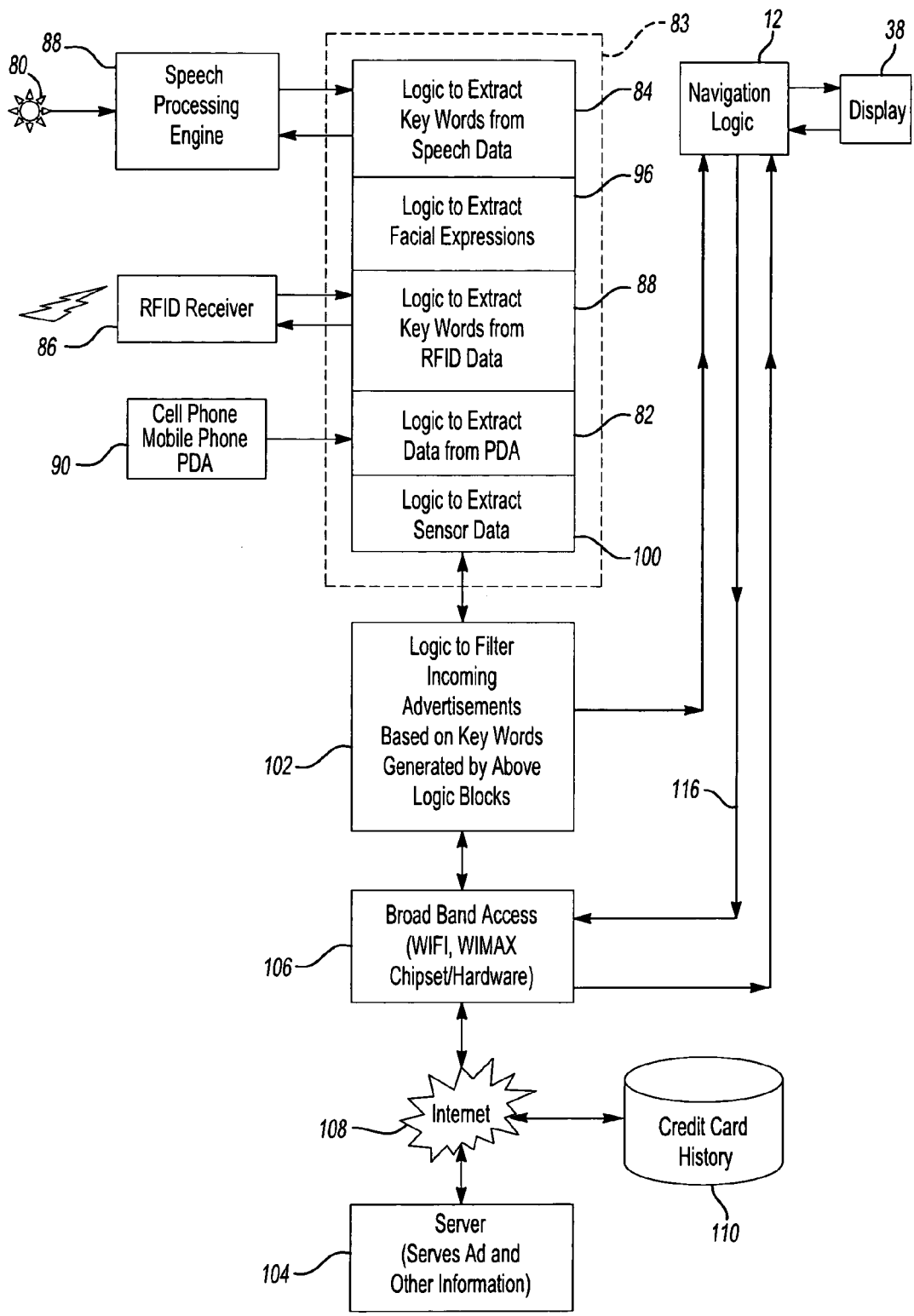
FIG. 5 is a diagrammatic view similar to FIG. 4, but illustrating a further modification thereof.

A modification to the system illustrated in FIG. 4 is shown in FIG. 5. In this modification of the invention, the display of advertising content on the navigation system screen 38 is filtered to not only limit the display of the advertising content to advertisements that may be of interest to the vehicle occupants, but to also filter the received advertising content as a function of the vehicle route so that only advertising content within a reasonable distance from the route will be shown on the display screen.

Still referring to FIG. 5, the system includes navigation logic 114 which provides a data output on output line 116 to the broadband access 106 indicative of the route information of the vehicle. The navigation logic 114 then receives inputs from both the logic filter 102 as well as the broadband access 106. The broadband access 106 in response to the route information received on input line 116 only sends information to the navigation logic 114 of advertising content along the route. When combined with the signal from the logic filter 102, the navigation logic 114 provides output signals to the display 38 so that only advertising content that may be of interest to the occupants of the vehicle along the route is displayed.

It will, of course, be appreciated that the advertising content providers 104 may be charged an advertising fee for advertising content actually displayed on navigation screen 38 in the vehicles. In this event, the navigation system provides information through the broadband access 106 to the advertising content server 104 which processes the advertising information actually displayed on the vehicle navigation screen 38 and charges the advertising entity accordingly.

Furthermore, the advertising rates charged to a particular advertising entity may vary as a function of many other factors, such as time of day, size of the advertisement on the navigation screen, type of advertisement displayed on the navigation screen, etc. For example, an advertisement containing advertising content from a fast food restaurant is more valuable to the fast food restaurant if advertised between 11:00 and 1:00, when many people eat, as opposed to 3:30 p.m., when most do not.

Still referring to FIGS. 4 and 5, the navigation logic 112 may also take into account various factors which potentially have an impact upon the safety of the vehicle and its passengers when displaying advertising information on the display screen 38. For example, whenever the vehicle speed exceeds a certain amount, e.g. sixty miles an hour, the navigation logic 112 may stop the display of all advertisements on the screen 38 in an effort to avoid driver distraction and thus increase the safety of the vehicle occupants and the vehicle itself.

Similarly, other conditions, such as hazardous weather conditions or other hazardous road conditions, may be detected by the navigation logic 112 and used to suspend or block all advertisements displayed on the screen 38 for fear of distracting the driver. Still other criteria may be utilized by the navigation logic 112 to impede or suspend the display of advertising content on the display screen 38 to enhance driver safety.

As a still further safety feature of the present invention, the screen 38 may be a double image display screen capable of displaying two images, one toward the driver side of the vehicle and the other toward the passenger side. In this event, advertising content and other information may be freely displayed to the passenger side of the passenger compartment without fear of distracting the driver. Conventional sensors, such as a camera, weight sensors and the like, may also be utilized to detect the presence or absence of a passenger and to accordingly inhibit or display the advertising content to the vehicle passenger.

From the foregoing, it can be seen that the present invention provides a navigation system for displaying waypoint information which is not only effective in operation, but also enhances the driving experience for the passengers of the vehicle.

Having described our invention, however, many modifications thereto will become apparent to those skilled in the art to which it pertains without deviation from the spirit of the invention as defined by the scope of the appended claims.

We claim:

1. A method for displaying information on a vehicle navigation system having a screen and a data receiver comprising the steps of:
    displaying a route on the screen,
    receiving criteria which identifies desired waypoint(s) along said route,
    receiving waypoint(s) by the data receiver,
    comparing the received waypoint(s) with the desired waypoint(s), and
    selectively displaying received waypoint(s) on the screen which correspond to the desired waypoint(s),
    wherein the screen provides a first image toward the driver of the vehicle and a second image towards the passenger side of the vehicle and wherein said displaying step comprises the step of displaying the waypoint(s) only as said second image.

2. The invention as defined in claim 1 wherein said receiving step comprises the step of verbally receiving criteria which identify desired waypoint(s) to a speech processor contained in the navigation system.

3. The invention as defined in claim 2 wherein said verbally receiving step further comprises the step of sampling speech within the vehicle, searching the sampled speech for key words corresponding to waypoint information, and equating said key words to the desired waypoint(s).

4. The invention as defined in claim 1 wherein said receiving step comprises the step of reading an RFID tag contained in the vehicle.

5. The invention as defined in claim 1 wherein the received waypoint(s) comprise advertising.

6. The invention as defined in claim 5 and comprising the step of charging a fee to the advertiser for each waypoint(s) displayed on the screen from the advertiser.

7. The invention as defined in claim 6 and further comprising the step of varying the fee as a function of one or more factors selected from the group of:
    a) road type currently traveled by the vehicle,
    b) time of day,
    c) duration that the waypoint(s) is displayed on the screen,
    d) size of the display of the waypoint(s) on the screen,
    e) geographic location of the vehicle, and
    f) historical profile information of the vehicle occupant.

8. The invention as defined in claim 1 wherein said receiving step further comprises the step of tracking the eyeball gaze of an occupant of the vehicle.

9. The invention as defined in claim 1 and further comprising the step of limiting the size, number, manner and/or duration of waypoint(s) displayed on the screen as a function of one or more factors selected from the group of:
    a) road type currently traveled by the vehicle,
    b) weather conditions, and
    c) vehicle speed.

10. Apparatus for displaying information on a vehicle navigation system having a screen and a data receiver comprising:
    means for displaying a route on the screen,
    means for receiving criteria which identifies desired waypoint(s) along said route,
    means for receiving waypoint(s) by the data receiver,
    means for comparing the received waypoint(s) with the desired waypoint(s), and
    means for selectively displaying received waypoint(s) on the screen which correspond to the desired waypoint(s),
    wherein the screen provides a first image toward the driver of the vehicle and a second image towards the passenger side of the vehicle and wherein said displaying means comprises the means for displaying the waypoint(s) only as said second image.

11. The invention as defined in claim 10 wherein said receiving means comprises a speech processor and means for verbally inputting the desired waypoint(s) to said speech processor.

12. The invention as defined in claim 11 wherein said verbally receiving means further comprises means for sampling speech within the vehicle, means for searching the sampled speech for key words corresponding to waypoint information, and means for equating said key words to the desired waypoint(s).

13. The invention as defined in claim 10 wherein the received waypoint(s) comprise advertising.

14. The invention as defined in claim 13 and further comprising means for charging a fee for said advertising and means for varying the fee as a function of one or more factors selected from the group of:
    a) road type currently traveled by the vehicle,
    b) time of day,
    c) duration that the waypoint(s) is displayed on the screen,
    d) size of the display of the waypoint(s) on the screen,
    e) geographic location of the vehicle, and
    f) historical profile information of the vehicle occupant.

15. The invention as defined in claim 10 and further comprising means for detecting the presence of a passenger in the passenger seat of the vehicle and for inhibiting said display means if no passenger is present.

16. The invention as defined in claim 10 and further comprising means for limiting the size, number, manner and/or duration of waypoint(s) displayed on the screen as a function of one or more factors selected from the group of
   a) road type currently traveled by the vehicle,
   b) weather conditions, and
   c) vehicle speed.

* * * * *

UNITED STATES PATENT AND TRADEMARK OFFICE
CERTIFICATE OF CORRECTION

PATENT NO. : 7,640,104 B2  Page 1 of 1
APPLICATION NO. : 11/364119
DATED : December 29, 2009
INVENTOR(S) : Ramaswamy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 977 days.

Signed and Sealed this

Ninth Day of November, 2010

David J. Kappos
*Director of the United States Patent and Trademark Office*